(12) United States Patent
Fukagawa

(10) Patent No.: US 9,081,026 B2
(45) Date of Patent: Jul. 14, 2015

(54) OPENING/CLOSING BODY INSPECTION APPARATUS AND OPENING/CLOSING BODY INSPECTION METHOD

(71) Applicant: Nissan Motor Co., Ltd., Yokohama-shi, Kanagawa (JP)

(72) Inventor: Hirotoshi Fukagawa, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/380,090

(22) PCT Filed: Mar. 5, 2013

(86) PCT No.: PCT/JP2013/056006
§ 371 (c)(1),
(2) Date: Aug. 21, 2014

(87) PCT Pub. No.: WO2013/133277
PCT Pub. Date: Sep. 12, 2013

(65) Prior Publication Data
US 2015/0043781 A1 Feb. 12, 2015

(30) Foreign Application Priority Data
Mar. 5, 2012 (JP) ................................. 2012-048209

(51) Int. Cl.
| G06K 9/00 | (2006.01) |
|---|---|
| G01P 3/36 | (2006.01) |
| B62D 65/00 | (2006.01) |
| G06T 7/20 | (2006.01) |
| G01L 1/00 | (2006.01) |
| G01M 13/00 | (2006.01) |
| G01M 17/00 | (2006.01) |
| G06T 7/00 | (2006.01) |

(52) U.S. Cl.
CPC ............... *G01P 3/36* (2013.01); *B62D 65/005* (2013.01); *G01L 1/00* (2013.01); *G01M 13/00* (2013.01); *G01M 17/00* (2013.01); *G06T 7/0004* (2013.01); *G06T 7/20* (2013.01)

(58) Field of Classification Search
USPC ................................................ 382/103, 104
See application file for complete search history.

(56) References Cited

U.S. PATENT DOCUMENTS

2006/0110008 A1* 5/2006 Vertegaal et al. ............. 382/103

FOREIGN PATENT DOCUMENTS

| JP | 2002-65641 A | 3/2002 |
|---|---|---|
| JP | 2005-1543 A | 1/2005 |
| JP | 2006-3140 A | 1/2006 |
| JP | 2007-139596 A | 6/2007 |
| JP | 2008-27363 A | 2/2008 |

* cited by examiner

*Primary Examiner* — Duy M Dang
(74) *Attorney, Agent, or Firm* — Global IP Counselors, LLP

(57) ABSTRACT

An opening/closing body inspection apparatus evaluates the closing performance of an opening/closing body open-and-closably attached to an opening/closing body support member. The apparatus includes a marker configured to be attached to the opening/closing body, a load-detecting device for detecting a load upon the opening/closing body attached to the marker, an image-capturing device for capturing an image of the movement path of the marker as the marker moves in tandem with the motion of the opening/closing body being closed by the load, an image-processing device for analyzing image data obtained by the image-capturing device, and a performance-assessing device for assessing the closing performance of the opening/closing body on the basis of the movement distance calculated by the image-processing device and the load detected by the load-detecting device.

15 Claims, 9 Drawing Sheets

OPENING/CLOSING BODY INSPECTION APPARATUS AND OPENING/CLOSING BODY INSPECTION METHOD

CROSS-REFERENCE TO RELATED APPLICATIONS

This application is a U.S. National stage application of International Application No. PCT/JP2013/056006, filed Mar. 5, 2013, which claims priority to Japanese Patent Application No. 2012-048209 filed in Japan on Mar. 5, 2012, the contents of each of which are hereby incorporated herein by reference.

BACKGROUND

1. Field of the Invention

The present invention relates to an opening/closing body inspection apparatus and an opening/closing body inspection method for evaluating the closing performance of an opening/closing body.

2. Background Information

The closing performance of opening/closing bodies such as doors and trunk lids is evaluated as part of automobile pre-shipment inspections. For example, Japanese Laid-Open Patent Application Publication No. 2005-001543 proposes a door closing inspection device for evaluating the closing performance of a door using a load cell and an angular velocity sensor.

In this door closing inspection device, the load cell and angular velocity sensor are attached to the door being inspected, and the load placed upon the door and the angular velocity of the door when closed by a worker are measured. This arrangement makes it possible to assess whether the door has been completely closed at a closing speed equal to or less than a specified value on the basis of the load upon the door, the angular velocity of the door, and movement distance as calculated from the door length.

SUMMARY

However, in the case of the door closing inspection device described above, the angular velocity of the door is measured by the angular velocity sensor. As a result, the problem arises that, although the movement distance of an opening/closing body that opens and closes along an arc-shaped path can be accurately calculated, the movement distance of an opening/closing body that has an unusual opening and closing path, such as a trunk lid provided with a four-link hinge mechanism, cannot be accurately calculated.

The present invention was conceived in order to solve the problem described above. Accordingly, an object of the present invention is to provide an opening/closing body inspection apparatus and an opening/closing body inspection method capable of accurately calculating the movement distance of an opening/closing body that has an unusual opening and closing path and evaluating the closing performance of the opening/closing body.

The abovementioned object of the present invention is achieved through the following means.

An opening/closing body inspection apparatus according to the present invention is an opening/closing body inspection apparatus for evaluating the closing performance of an opening/closing body open-and-closably attached to an opening/closing body support member, the apparatus comprising a marker, a load-detecting means, an image-capturing means, an image-processing means, and a performance-assessing means. The marker is attached to the opening/closing body. The load-detecting means detects a load upon the opening/closing body to which the marker is attached. The image-capturing means captures an image of the movement path of the marker as the latter moves in tandem with the motion of the opening/closing body being closed by the load. The image-processing means analyzes image data obtained by the image-capturing means capturing the image of the movement path of the marker, and calculates the movement distance of the opening/closing body. The performance-assessing means assesses the closing performance of the opening/closing body on the basis of the movement distance calculated by the image-processing means and the load detected by the load-detecting means.

Another opening/closing body inspection apparatus according to the present invention is an opening/closing body inspection apparatus for evaluating the closing performance of an opening/closing body open-and-closably attached to an opening/closing body support member, the apparatus comprising a reference marker, a detection marker, a load-detecting means, an image-capturing means, an image-processing means, and a performance-assessing means. The reference marker is attached to the opening/closing body support member. The detection marker is attached to the opening/closing body. The load-detecting means detects a load upon the opening/closing body to which the detection marker is attached. The image-capturing means captures an image of the position of the detection marker and the position of the reference marker as they move in tandem with the motion of the opening/closing body being closed by the load. The image-processing means analyzes image data obtained by the image-capturing means capturing the image of the movement path of the detection marker and the movement path of the reference marker, and calculates the movement distance of the opening/closing body with respect to the opening/closing body support member. The performance-assessing means assesses the closing performance of the opening/closing body on the basis of the movement distance calculated by the image-processing means and the load detected by the load-detecting means.

An opening/closing body inspection method according to the present invention is an opening/closing body inspection method for evaluating the closing performance of an opening/closing body open-and-closably attached to an opening/closing body support member, the method comprising a measuring step, an image processing step, and an assessment step. In the measuring step, an image-capturing means captures an image of the movement path of a marker attached to the opening/closing body as the marker moves in tandem with the motion of the opening/closing body being closed by a load placed thereupon while a load-detecting means detects the load placed upon the opening/closing body. In the image processing step, image data obtained by the image-capturing means capturing the image of the movement path of the marker is analyzed, and the movement distance of the opening/closing body is calculated. In the assessment step, the closing performance of the opening/closing body is assessed on the basis of the calculated movement distance and the load detected by the load-detecting means.

Another opening/closing body inspection method according to the present invention is an opening/closing body inspection method for evaluating the closing performance of an opening/closing body open-and-closably attached to an opening/closing body support member, the method comprising a measuring step, an image processing step, and an assessment step. In the measuring step, an image-capturing means captures an image of the position of a reference marker attached to the opening/closing body support member and the position of a detection marker attached to the opening/closing body as the detection marker moves in tandem with the motion of the opening/closing body being closed by a load placed thereupon while a load-detecting means detects the load placed upon the opening/closing body. In the image processing step, image data obtained by the image-capturing means capturing the image of the movement path of the detection marker and the movement path of the reference marker is analyzed, and the movement distance of the opening/closing body is calculated. In the assessment step, the closing performance of the opening/closing body is assessed on the basis of the calculated movement distance and the load detected by the load-detecting means.

In accordance with the present invention, the image-capturing means captures an image of the movement path of the marker, allowing the movement distance of the opening/closing body to be accurately calculated. It is thereby possible to evaluate the closing performance of an opening/closing body that has an unusual opening and closing path.

BRIEF DESCRIPTION OF THE DRAWINGS

Referring now to the attached drawings which form a part of this original disclosure.

DETAILED DESCRIPTION OF EMBODIMENTS

Figure 1:
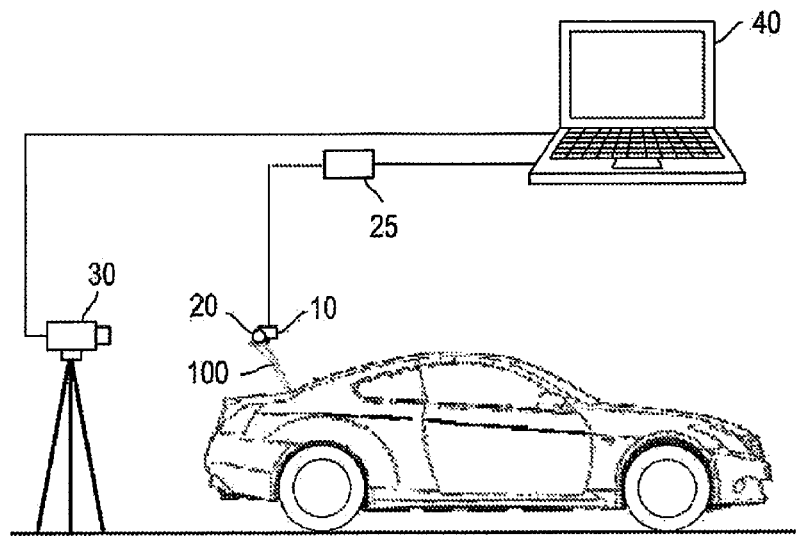
FIG. 1 is a schematic view of the configuration of an opening/closing body inspection apparatus according to a first embodiment of the present invention.

The following is a description of embodiments of the present invention from a first embodiment to a third embodiment with reference to the drawings. In the drawings, similar members have been identically labeled.

Embodiment 1

Configuration of Opening/Closing Body Inspection Apparatus

FIG. 1 is a schematic view of the configuration of an opening/closing body inspection apparatus according to a first embodiment of the present invention. The following description features an example in which the closing performance of a trunk lid (hereafter simply "trunk") with a four-link hinge mechanism is evaluated.

As shown in FIG. 1, an opening/closing body inspection apparatus according to a first embodiment includes a load cell 10, a reflective marker 20, a camera 30, and a computer ("PC") 40. The load cell 10 and the reflective marker 20 are attached to a trunk 100 of an automobile. The load cell 10 and the camera 30 are connected to the PC 40.

As a load-detecting means or device, the load cell 10 detects loads placed upon the trunk 100 of the automobile. The load cell 10 is attached to a jig (not illustrated) capable of being tilted forward and backward, and is configured so that an input unit of the load cell 10 can be tilted forward and backward. A suction cup is attached to the jig, and the load cell 10 is removably attached to a lower end of the trunk 100 by the suction cup. The load cell 10 of the first embodiment is a strain gauge-type load sensor, and is capable of detecting dynamic loads placed upon the trunk 100. Signals from the load cell 10 are transmitted to the PC 40 through a strain amplifier and an A/D converter 25.

The reflective marker 20 is for calculating the displacement level (movement distance) of the trunk 100 of the automobile. The reflective marker 20 is formed from a highly reflective material, and is photographed by the camera 30. The reflective marker 20 is provided with a magnet (illustrated), and the reflective marker 20 is removably attached to the lower end of the trunk 100 by the magnet.

As an image-capturing means or device, the camera 30 captures an image of the movement path of the reflective marker 20 as the latter moves in tandem with the motion of the trunk 100. The camera 30 is a three-dimensional camera disposed to the rear of the automobile. An infrared LED (not illustrated) is disposed on the periphery of the camera 30, and irradiates the reflective marker 20 with infrared radiation. The camera 30 continuously takes images of the movement path of the reflective marker 20 at predetermined time intervals when the trunk 100 is closed. Signals from the camera 30 are transmitted to the PC 40.

The PC 40 assesses the closing performance of the trunk 100 of the automobile. The PC 40 assesses whether the closing performance of the trunk 100 is acceptable on the basis of the signals from the load cell 10 and the camera 30.

Figure 2:
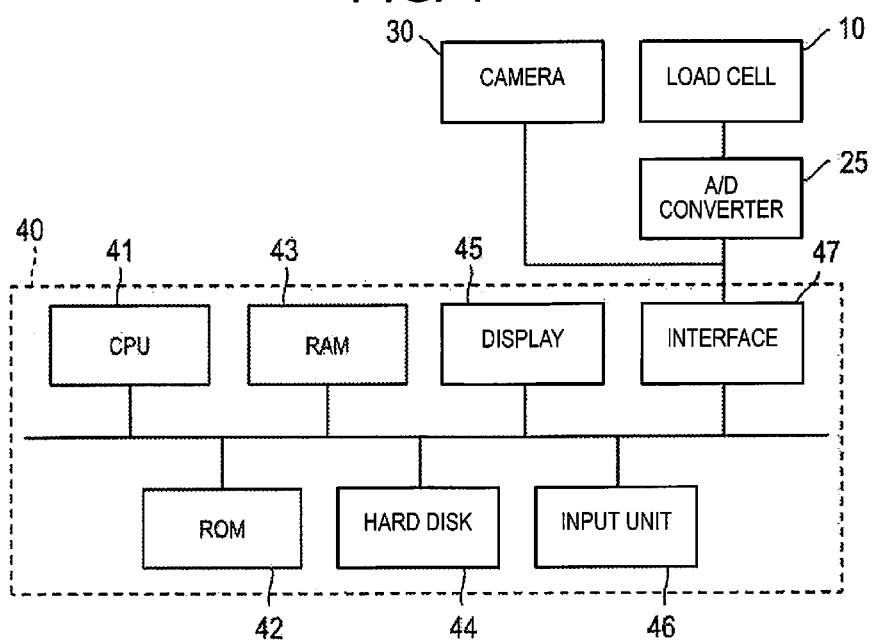
FIG. 2 is a block diagram of the configuration of the opening/closing body inspection apparatus shown in FIG. 1.

FIG. 2 is a block diagram of the configuration of the opening/closing body inspection apparatus shown in FIG. 1.

As shown in FIG. 2, the PC 40 comprises a CPU 41, ROM 42, RAM 43, a hard disk 44, a display 45, an input unit 46, and an interface 47. These various components are connected to each other on a path.

The CPU 41 controls the various components described above and performs various computing processes according to a program. The CPU 41 functions as an image-processing unit (image-processing means), a performance-assessing unit (performance-assessing means), an incomplete closure-determining unit (incomplete closure-determining means), a mask-setting unit (mask-setting means), and an interpolator unit (interpolation means) by executing programs stored in the hard disk 44.

At this point, the image-processing unit analyzes image data obtained by the camera 30 photographing the movement path of the reflective marker 20 to calculate the displacement level of the trunk 100. The performance-assessing unit assesses the closing performance of the trunk 100 on the basis of the displacement level of the trunk 100 and the load calculated by the load cell 10. The incomplete closure-determining unit determines whether the trunk 100 is not completely closed on the basis of the position of the reflective marker 20. The mask-setting unit sets a mask zone on the image data in order to extract a movement path. The interpolator unit divides the area between two positions of the reflective marker 20 calculated from two temporally adjacent image data into a plurality of sections, and interpolates the image data. The specific processes performed by the various components will be described hereafter.

Various programs and data are pre-stored in the ROM 42. The RAM 43 acts as a workspace in which programs and data are temporarily stored.

The hard disk 44 stores various programs and data, including an operating system (OS). The hard disk 44 stores a program for analyzing image data to calculate the displacement level of the trunk 100, a program for assessing the closing performance of the trunk 100, a program for assessing whether the trunk 100 is not completely closed, and the like.

The display 45 is, for example, an LCD, and displays computing results from the CPU 41. The computing results include, for example, the results of assessing whether the trunk 100 is not completely closed, and evaluation results for the closing performance of the trunk 100.

The input unit 46 is, for example, a keyboard, touch panel, and a pointer device such as a mouse, and is used to input various types of information.

The interface 47 electrically connects the PC 40 with the load cell 10 and the camera 30. The interface 47 receives signals from the load cell 10 and the camera 30.

The opening/closing body inspection apparatus according to the first embodiment configured as described above is used to evaluate the closing performance of the trunk 100 of the automobile.

Figure 3A:
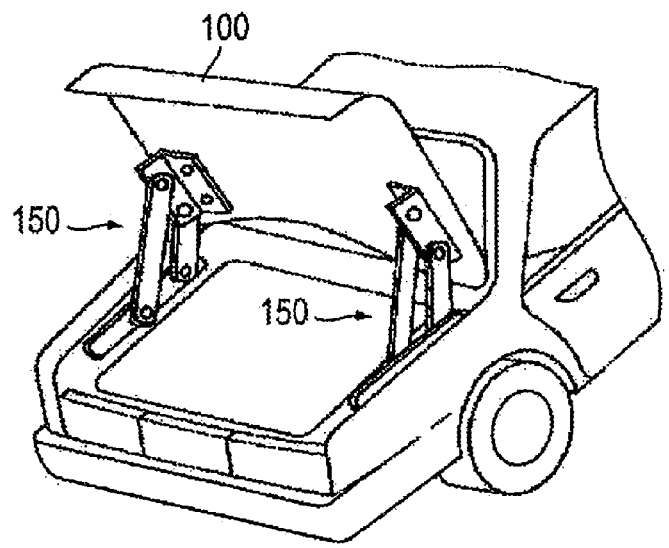
FIG. 3A is diagram illustrating the opening and closing path of a trunk with a four-link hinge mechanism.

First, the opening and closing path of the trunk 100 constituting the object of inspection will be described with reference to FIGS. 3A and 3B. FIG. 3A is a schematic perspective view of the configuration of a trunk provided with a four-link hinge mechanism, and FIG. 3B is a diagram illustrating the opening and closing path of a trunk with a four-link hinge mechanism.

As described above, the trunk 100 of the automobile constituting the object of inspection is provided with a four-link hinge mechanism 150. As shown in FIG. 3A, the upper end of the trunk 100 is coupled to the main body of an automobile (an opening/closing body support member) by the four-link hinge mechanism 150. The trunk 100 attached to the main body of the automobile by the four-link hinge mechanism 150 has a different opening and closing path than a trunk attached by an ordinary hinge.

Figure 3B:
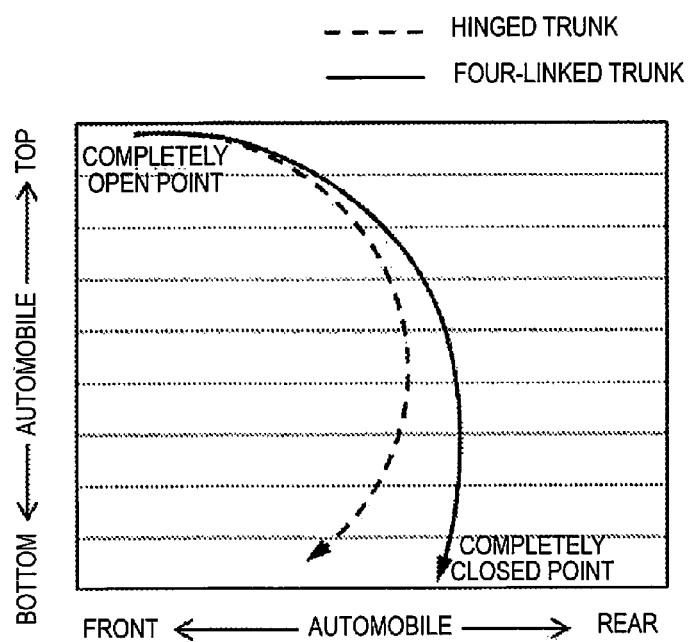
FIG. 3B is a diagram showing the opening and closing path of the trunk of FIG. 3A.

As shown by the dotted line in FIG. 3B, a trunk attached by an ordinary hinge has an arc-shaped opening and closing path. Meanwhile, as shown by the solid line in FIG. 3B, the trunk 100 provided with the four-link hinge mechanism 150 has an unusual, non-arc-shaped opening and closing path. In addition, whereas an ordinary trunk having an arc-shaped opening and closing path is closed at a constant speed, the speed of the trunk 100 provided with the four-link hinge mechanism 150 changes over the course of closing. The speed of the trunk 100 provided with the four-link hinge mechanism 150 is greatest immediately prior to closing.

In the opening/closing body inspection apparatus according to the first embodiment, the reflective marker 20 is attached to the lower end of the trunk 100 and the movement path of the reflective marker 20 is photographed by the camera 30 in order to accurately calculate the displacement level of the trunk 100, which has an unusual opening and closing path. An inspection method using the opening/closing body inspection apparatus will now be described with reference to FIGS. 4-7.

Figure 4:
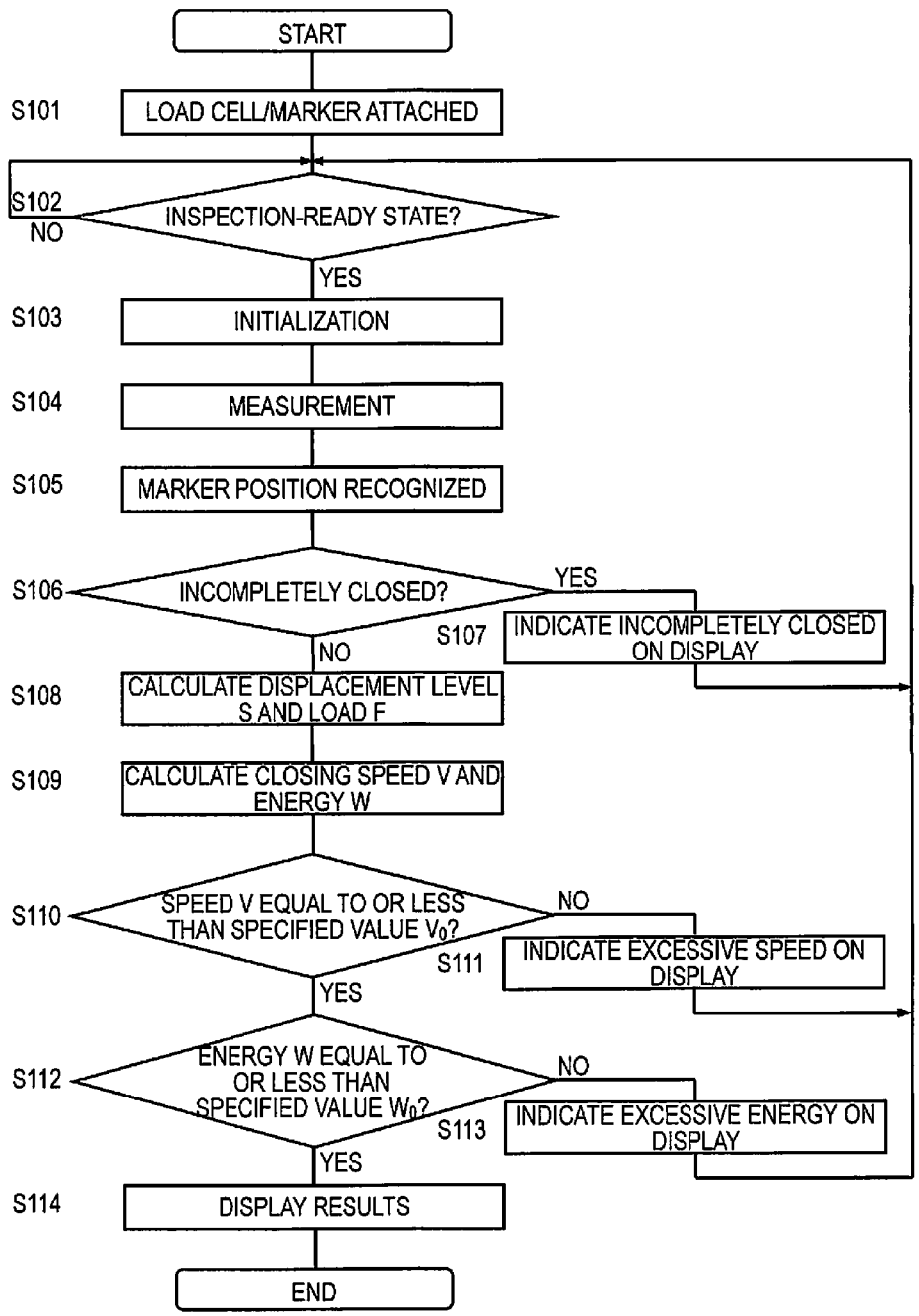
FIG. 4 is a flow chart of the procedure of an inspection process performed using an opening/closing body inspection apparatus according to the first embodiment and a second embodiment of the present invention.

FIG. 4 is a flow chart of the procedure of an inspection process performed using the opening/closing body inspection apparatus according to the first embodiment.

Operation of Opening/Closing Body Inspection Apparatus

First, the load cell 10 and the reflective marker 20 are attached (step S101). Specifically, the load cell 10 and the reflective marker 20 are attached to predetermined positions on the lower end of the trunk 100 with the trunk 100 in a completely closed state. At this time, the reflective marker 20 is photographed by the camera 30, and the position of the reflective marker 20 when the trunk 100 is in a completely closed state is stored.

The following is a description of an actual evaluation process being executed. First, it is determined whether the trunk is in an inspection-ready state (standby state) (step S102). Specifically, it is determined whether the trunk 100 to which the load cell 10 and the reflective marker 20 are attached is in an open state. It is determined whether the trunk is in an inspection-ready state on the basis, for example, of the position of the reflective marker 20 photographed by the camera 30, or of changes in the dynamic load applied to the trunk 100.

If it is determined that the trunk is not in an inspection-ready state (step S102: NO), the trunk 100 is opened by a worker, and the apparatus waits until an inspection-ready state is reached. On the other hand, if it is determined that the trunk is in an inspection-ready state (step S102: YES), an initialization process is executed (step S103). After the initialization process has been executed, a new measurement is begun.

Next, measurement is performed (step S104). Specifically, a worker closes the trunk 100, during which period the load (operating force) placed upon the trunk 100 by the worker is detected by the load cell 10. Simultaneously, the movement path of the reflective marker 20 moving in tandem with the motion of the closing trunk 100 is photographed by the camera 30.

Next, the position of the reflective marker 20 is recognized (step S105). Specifically, the image data obtained by the camera 30 is analyzed, and the position of the reflective marker 20 after the trunk 100 has been closed is recognized.

Next, it is determined whether or not the trunk 100 is completely closed (step S106). Specifically, it is determined whether the trunk 100 is completely closed or not completely closed. In the first embodiment, the position of the reflective marker 20 recognized in the process shown in step S105 is compared with a pre-stored position for when the trunk 100 is completely closed. If the position of the recognized reflective marker 20 is higher than the pre-stored position, it is determined that the trunk 100 is not completely closed.

If it is determined that the trunk 100 is not completely closed (step S106: NO), the display 45 displays that the trunk 100 is not completely closed (step S107), and the process returns to step S102. Upon seeing that the trunk 100 is not completely closed, the worker can recognize that insufficient force was used to close the trunk 100, and open the trunk 100 to repeat the inspection.

On the other hand, if the trunk 100 is determined to be completely closed (step S106: YES), the displacement level S of the trunk 100 and the load F placed upon the trunk 100 are calculated (step S108). Specifically, the image data obtained by the camera 30 photographing the movement path of the reflective marker 20 is analyzed, and the displacement level of the reflective marker 20 is calculated as the displacement level S of the trunk 100. The load F placed upon the trunk 100 when the worker closes the trunk 100 is also calculated on the basis of load data obtained by the load cell 10. At this point, a data interpolation process is performed upon the image data in order to synchronize the load cell 10 and the camera 30. A masking process is also performed upon the image data in order to eliminate ambient light interference. The details of the data interpolation process and the masking process will be described hereafter. The technique itself of analyzing the image data obtained by photographing the movement path of the reflective marker 20 to calculate the displacement level of the reflective marker 20 is an ordinary image processing technique; thus, detailed description thereof will be omitted.

Next, the closing speed V and the energy W of the trunk 100 are calculated (step S109). Specifically, the displacement level S of the trunk 100 calculated using the process shown in step S108 is temporally derived in order to calculate the closing speed V of the trunk 100. The integrated value of the load F calculated using the process shown in step S108 and the displacement level S of the trunk 100 is also calculated in order to calculate the energy W when the trunk 100 is closed.

Figure 5:
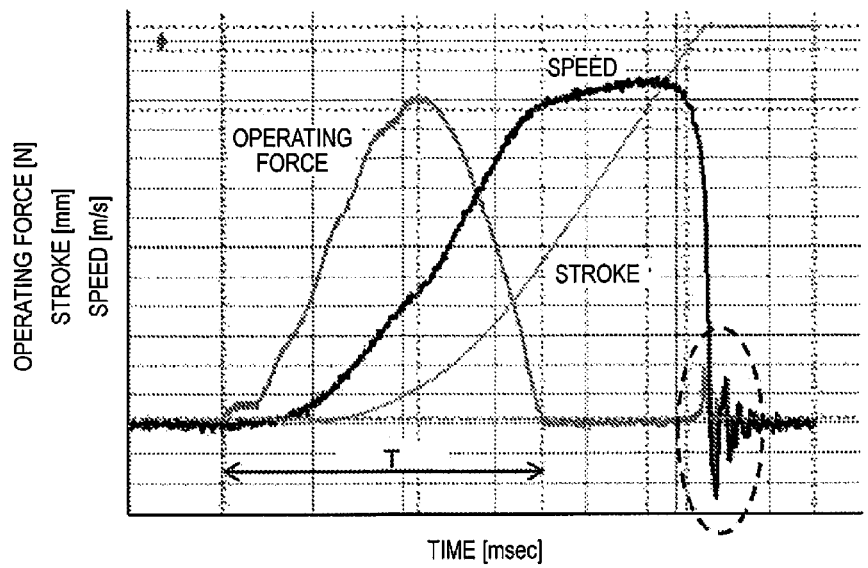
FIG. 5 is a diagram illustrating the closing speed and energy of a trunk.

FIG. 5 is a diagram for illustrating the closing speed and energy of the trunk. In FIG. 5, the x-axis is time, and the y-axis is load (operating force), displacement level (stroke), and speed.

First, the load F placed upon the trunk 100 and the displacement level S of the trunk 100 are calculated on the basis of the load data and image data obtained by the load cell 10 and the camera 30, respectively, as described above. The closing speed V and energy W are then calculated on the basis of the load F and displacement level S per unit of time.

As shown in FIG. 5, the displacement level S increases over time, and stays at a constant value once the trunk 100 has been completely closed. The load F reaches its maximum value immediately after the worker begins to close the trunk 100, and decreases afterward. The moment the trunk 100 closes, a reaction from the main body of the automobile acts upon the trunk 100 (see the area circled by the dotted line in FIG. 5). The closing speed V increases over time, and reaches its maximum value immediately before the trunk 100 closes. The energy W is calculated as the integrated value of the load F and the displacement level S during the time interval T during which the load placed by the worker is detected.

Next, it is determined whether the closing speed V immediately prior to the trunk 100 closing is equal to or less than a specified value $V_0$ (step S110). Specifically, it is determined whether or not the closing speed V calculated using the process shown in step S109 is equal to or less than a predetermined specified value $V_0$. More specifically, it is determined whether the average closing speed V over a predetermined distance interval preceding a door closed position at which the trunk 100 is completely closed is equal to or less than the specified value $V_0$.

If it is determined that the closing speed V is not equal to or less than the specified value $V_0$ (step S110: NO), the display 45 displays that the closing speed V is excessive (step S111), and the process returns to step S102. Upon seeing that the closing speed V is excessive, the worker can recognize that excessive force was used to close the trunk 100, and open the trunk to repeat the inspection.

On the other hand, if it is determined that the closing speed V is equal to or less than the specified value $V_0$ (step S110: YES), it is determined whether or not the energy W is equal to or less than a specified value $W_0$ (step S112). Specifically, it is determined whether the energy W calculated using the process shown in step S109 is equal to or less than a predetermined specified value $W_0$.

If it is determined that the energy W is not equal to or less than the specified value $W_0$ (step S112: NO), the display 45 displays that the energy W is excessive (step S113), and the process returns to step S102. Upon seeing that the energy W is excessive, the worker can recognize that excessive force was used to close the trunk 100, and open the trunk to repeat the inspection.

On the other hand, if it is determined that the energy W is equal to or less than the specified value $W_0$ (step S112: YES), the results are displayed on the display 45 (step S114), and the process finishes. Specifically, the display 45 displays the closing speed V and the energy W, and indicates that closing performance is satisfactory. The closing performance of the trunk 100 is better the lower the closing speed V is. Similarly, the closing performance of the trunk 100 is better the lower the energy W is. The various calculation results and assessment results are stored in the hard disk 44.

In accordance with the first embodiment, as described above, the camera 30 photographs the movement path of the reflective marker 20 attached to the trunk 100, thereby allowing the displacement level S of the trunk 100 to be accurately calculated. As a result, the closing speed V and energy W of the trunk 100 can be accurately calculated, and the closing performance of a trunk 100 that has an unusual opening and closing path can be evaluated.

In the first embodiment, the closing performance of the trunk 100 is evaluated in terms of both the closing speed and the energy of the trunk 100. However, it is also possible to evaluate the closing performance of the trunk 100 in terms of only one of closing speed or energy, unlike in the first embodiment.

The masking process and data interpolation process performed upon the image data will now be described with reference to FIGS. 6 and 7.

Figure 6A:
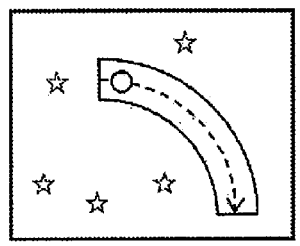
FIG. 6A is diagram illustrating image data prior to a masking process being performed thereon.
Figure 6B:
FIG. 6B is a diagram illustrating the image data of FIG. 6A when the masking process has been performed thereon.
Figure 6B:
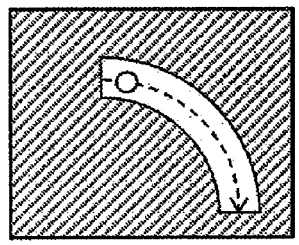

FIGS. 6A and 6B are diagrams illustrating the masking process performed upon the image data. As described above, the camera 30 photographs the movement path of the reflective marker 20 while directing infrared radiation from the infrared LED thereupon. However, because highly reflective parts such as emblems, plated parts, and combination lamps are present in automobiles, reflected light from these parts is included as ambient light interference (see FIG. 6A). In the first embodiment, a mask zone corresponding to the movement path of the reflective marker 20 is set on the image data, thereby eliminating ambient light interference (see FIG. 6B). The shape of the mask zone will vary according to automobile type.

Such an arrangement allows for the precise extraction of the movement path of the reflective marker 20, and the precise calculation of the displacement level of the trunk 100.

Figures 7A, 7B:
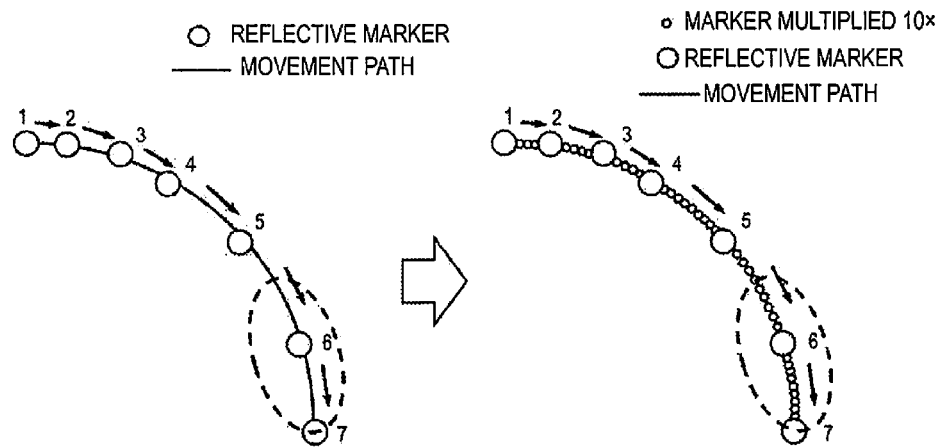
FIG. 7A is a diagram illustrating image data prior to multiplication in a data interpolation process being performed thereon.
FIG. 7B is a diagram illustrating the image data of FIG. 7B when multiplication has been performed.

FIGS. 7A and 7B are diagrams illustrating the data interpolation process performed upon the image data. The sampling frequency of the camera 30 is less than the sampling frequency of the load cell 10. For example, if the sampling frequency of the load cell 10 is 1,200 Hz and the sampling frequency of the camera 30 is 120 Hz, the image data is interpolated in order to synchronize the two. In the first embodiment, as shown in FIG. 7B, the area between two positions of the reflective marker 20 calculated from two temporally adjacent image data is divided into equal parts along a non-linear path.

This arrangement enables the camera 30 and the load cell 10, which has a sampling frequency ten times that of the camera 30, to be precisely synchronized, allowing for easy calculation of the energy W. Because the displacement level is calculated at 1/10th the time interval, the closing speed V prior to the trunk 100 closing (the closing speed in the part circled by the dotted line in FIGS. 7A and 7B) can be more accurately calculated.

The first embodiment described above yields the following effects.

(a) In the opening/closing body inspection apparatus and opening/closing body inspection method according to the first embodiment, the movement path of the reflective marker attached to the trunk is photographed by the camera, thereby allowing for accurate calculation of the displacement level of the trunk. As a result, the closing speed and energy of the trunk can be accurately calculated, and the closing performance of a trunk that has an unusual opening and closing path can be evaluated.

(b) A masking process is performed upon the image data, thereby eliminating ambient light interference from the image data. As a result, the movement path of the reflective marker can be precisely extracted, and the displacement level of the trunk can be precisely calculated.

(c) Because the data interpolation process is performed upon the image data, the load cell and the camera can be precisely synchronized. As a result, the energy can easily be calculated. Because the displacement level is calculated at 1/10th the time interval, the closing speed prior to the trunk closing can be more accurately calculated.

(d) Because the position of the reflective marker is used to determine whether or not the trunk is not completely closed, the worker is spared the labor of having to check whether the trunk is not completely closed. This eliminates mistaken evaluation errors arising from human error.

Embodiment 2

In the opening/closing body inspection apparatus according to the first embodiment described above, a single reflective marker 20 attached to the lower end of the trunk 100 is used to calculate the displacement level of the trunk 100. However, on a factory final inspection line, not only are sampling inspections performed on stopped automobiles, but final inspections are also performed on moving automobiles on a conveyor belt. In the opening/closing body inspection apparatus according to the first embodiment, the closing performance of the trunk 100 can be evaluated to a certain degree of accuracy in sampling inspections performed upon stopped vehicles. However, the closing performance of the trunk 100 cannot be accurately evaluated in final inspections performed upon moving automobiles.

One factor inhibiting the accurate evaluation of the closing performance of the trunk 100 is that suspension characteristics (softness) differs according to vehicle model, with the result that the vehicle body vibrates vertically according to the suspension characteristics when the trunk 100 is closed. Another factor is that when the trunk 100 is closed while the automobile is moving, the path of the reflective marker 20 when the trunk 100 is closed is different from its path when the automobile is stopped.

Figure 8:
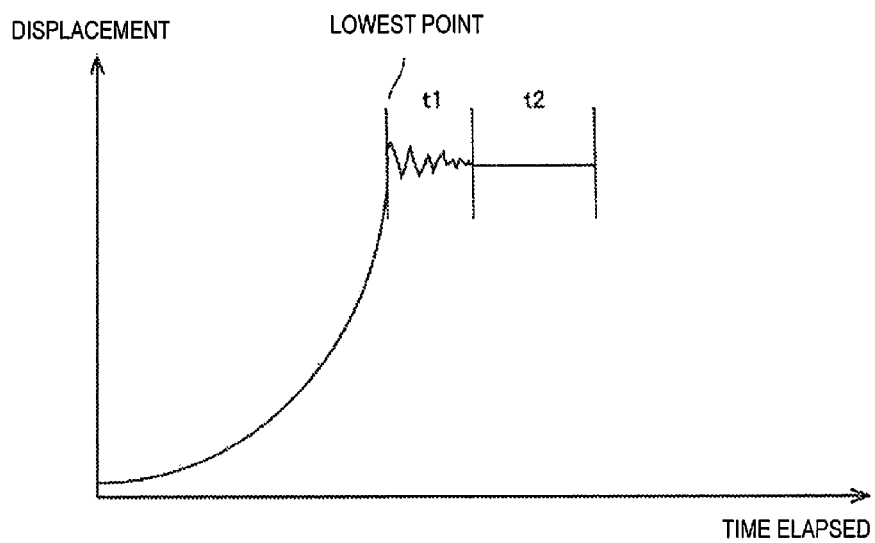
FIG. 8 is a diagram showing the movement path of a detection marker when the trunk shown in FIG. 3A is closed.
Figure 9:
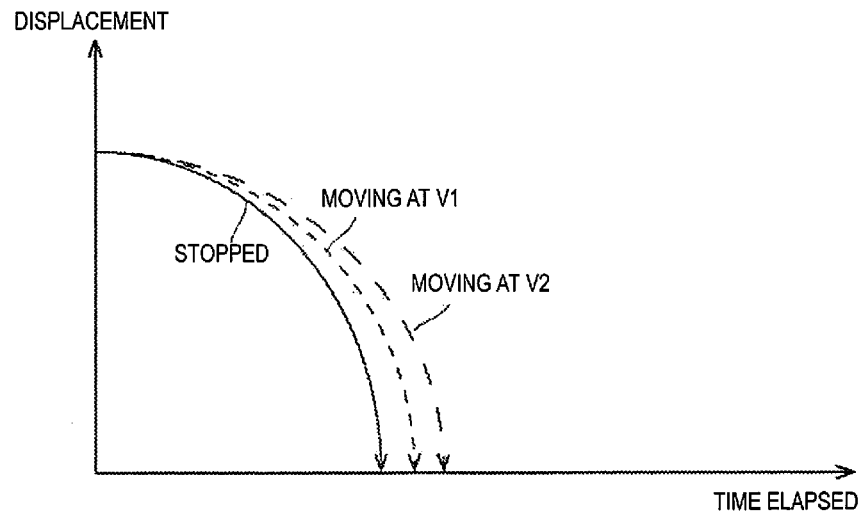
FIG. 9 is a diagram showing the movement path of a detection marker when an automobile is stopped and when it is moving.

FIG. 8 is a diagram showing the movement path of a detection marker 50 (see FIG. 10) when the trunk 100 is closed. FIG. 9 is a diagram showing the movement path of the detection marker 50 when the trunk is closed when an automobile is stopped and when it is moving.

In an automobile equipped with a comparatively soft suspension, as shown in FIG. 8, the vehicle body exhibits irregular vertical vibration from the time when the trunk 100 reaches a lowest point, at which it is completely closed, for a length of time t1. Subsequently, the position at which the trunk 100 has stopped is calculated for a length of time t2. As a result, displacement in the position of the detection marker 50 during the length of time t1 slightly affects evaluation of the closing performance of the trunk 100.

In the case of a sampling inspection performed upon a stopped automobile, the vehicle body vibrates only slightly when the trunk 100 is closed, allowing the closing performance of the trunk 100 to be evaluated with a certain degree of accuracy.

In the case of a final inspection performed upon an automobile, as shown in FIG. 9, the path of the detection marker 50 as seen from the camera 30 (see FIG. 10) varies according to the movement speed of the automobile. The solid line indicates the path of the detection marker 50 when the automobile is stopped, and the dotted lines indicate the path of the detection marker 50 when the automobile is moving at a speed V1 and at a speed V2 that is faster than V1. The paths of the dotted lines, which deviate from that of the solid line, negatively affect the precision of the evaluation of the closing performance of the trunk 100.

Accordingly, in the case of a final inspection performed on a moving automobile, displacement in the position of the detection marker 50 is affected by both the vibration of the vehicle when the trunk 100 is closed and the speed at which the automobile is being conveying, in turn greatly affecting the evaluation of the closing performance of the trunk 100.

In an opening/closing body inspection apparatus according to a second embodiment, not only is the detection marker 50 attached to the lower end of the trunk 100, but a reference marker 55 (see FIG. 10) is attached to a rear part of the vehicle body in order to eliminate the effects of both vibration when the trunk 100 is closed and the speed at which the automobile is conveyed. The position of the detection marker 50 is determined in terms of position relative to the reference marker 55. The opening/closing body inspection apparatus according to the second embodiment improves the precision with which the closing performance of the trunk 100 is evaluated in both sampling inspections performed upon stopped automobiles and final inspections performed upon moving automobiles.

Configuration of Opening/Closing Body Inspection Apparatus

Figure 10:
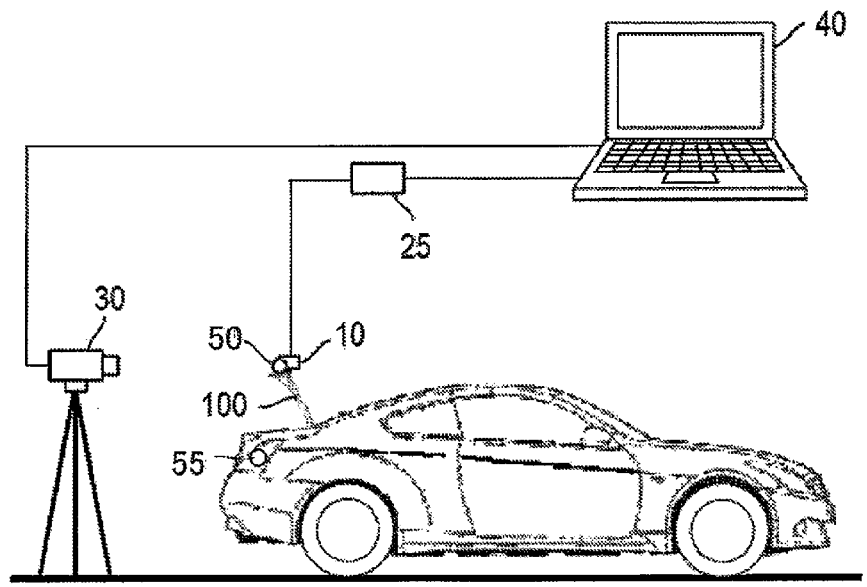
FIG. 10 is a schematic view of the configuration of an opening/closing body inspection apparatus according to the second embodiment of the present invention.

FIG. 10 is a schematic view of the configuration of the opening/closing body inspection apparatus according to the second embodiment of the present invention. The following description features an example in which the closing performance of a trunk equipped with a four-link hinge mechanism identical to that of the first embodiment is evaluated.

As shown in FIG. 10, the opening/closing body inspection apparatus according to the second embodiment is provided with a load cell 10, a detection marker 50, a camera 30, a reference marker 55, and a PC 40. The load cell 10 and the detection marker 50 are attached to a trunk 100 of an automobile. The reference marker 55 is attached to the rear part of the body of the automobile. The load cell 10 and the camera 30 are connected to the PC 40.

The load cell 10 and the detection marker 50 (identical to the reflective marker 20) are identical to those of the opening/closing body inspection apparatus according to the first embodiment. The A/D converter 25, camera 30, and PC 40 are also identical to those of the opening/closing body inspection apparatus according to the first embodiment.

The reference marker 55 is for detecting position relative to the detection marker 50. The reference marker 55, like the reflective marker 20, is formed from a highly reflective material, and is photographed by the camera 30. The reference marker 55 is provided with a magnet (not illustrated), and is removably attached to a rear fender part of the body of the automobile by the magnet.

The block diagram of the configuration of the opening/closing body inspection apparatus shown in FIG. 10 is identical to the block diagram of the configuration of the opening/closing body inspection apparatus according to the first embodiment shown in FIG. 2.

Figure 11:
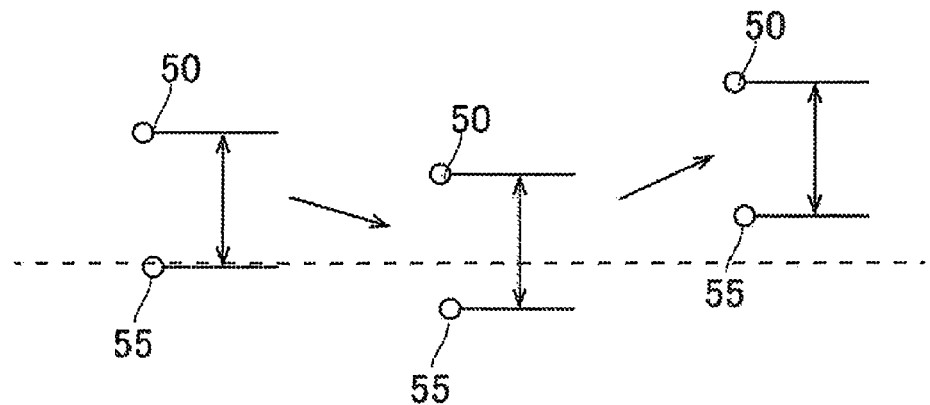
FIG. 11 is a diagram illustrating the relative positions of a detection marker and a reference marker.

In the second embodiment, the image-processing unit analyzes the image data obtained by the camera 30 photographing the movement path of the detection marker 50 and the movement path of the reference marker 55, and calculates the displacement level of the trunk 100 from the relative positions of the detection marker 50 and the reference marker 55 as shown in FIG. 11. This is because the relative positions of the detection marker 50 and the reference marker 55 remain the same regardless of whether the vehicle body vibrates vertically or moves forward or backward, as shown in FIG. 11. The performance-assessing unit assesses the closing performance of the trunk 100 on the basis of the displacement level of the trunk 100 and the load calculated by the load cell 10. The incomplete closure-determining unit determines whether or not the trunk 100 is not completely closed on the basis of the relative positions of the detection marker 50 and the reference marker 55.

The opening/closing body inspection apparatus according to the second embodiment, which is provided with the detection marker 50 and the reference marker 55, evaluates the closing performance of the trunk 100 of the automobile as follows.

Figure 12:
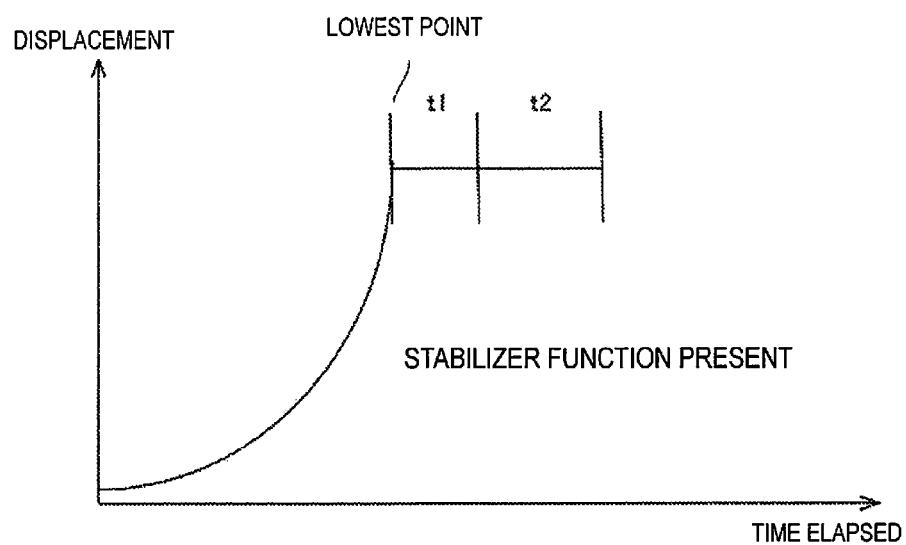
FIG. 12 is the movement path of a detection marker captured by the opening/closing body inspection apparatus according to the second embodiment during a sampling inspection.
Figure 13:
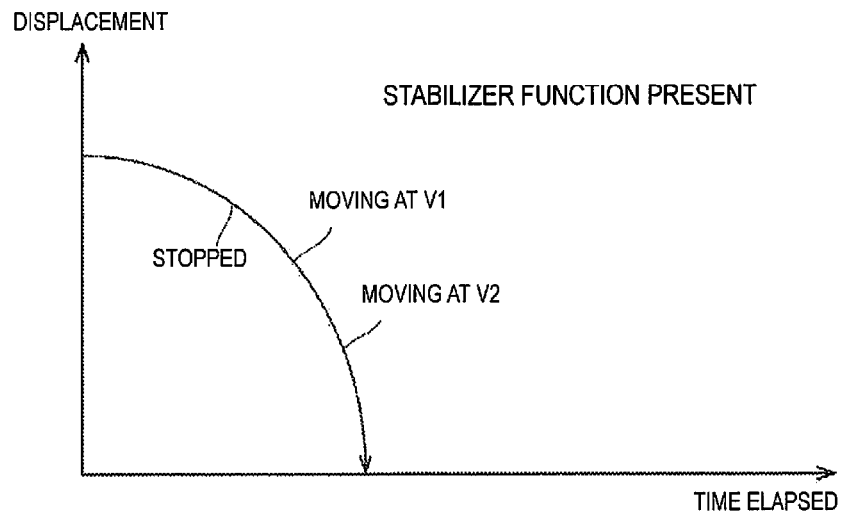
FIG. 13 is the movement path of a detection marker captured by the opening/closing body inspection apparatus according to the second embodiment during a final inspection.

As discussed above, the body of the automobile vibrates vertically when the trunk 100 is closed in a sampling inspection performed upon a stopped automobile, as shown in FIG. 8. As shown in FIG. 12, the opening/closing body inspection apparatus according to the second embodiment is capable of canceling out this vibration using a stabilizer function. Because the automobile is in motion until the trunk 100 is closed in a final inspection performed upon a moving automobile, the movement path of the trunk 100 as seen from the camera 30 varies as shown in FIG. 9. The opening/closing body inspection apparatus according to the second embodiment is capable of canceling out the effects of this movement of the automobile via a stabilizer function, as shown in FIG. 13. In this way, the opening/closing body inspection apparatus according to the second embodiment is capable of canceling out vertical vibration occurring when the trunk 100 is closed and changes in the movement path of the trunk 100 caused by the movement of the automobile via the stabilizer function.

Next, the operation of the opening/closing body inspection apparatus according to the second embodiment will be described. The operation of the opening/closing body inspection apparatus according to the second embodiment is roughly identical to the inspection process performed by the opening/closing body inspection apparatus according to the first embodiment. As such, the operation of the opening/closing body inspection apparatus according to the second embodiment will be described using the flow chart shown in FIG. 4.

Operation of Opening/Closing Body Inspection Apparatus

First, the load cell 10, detection marker 50, and reference marker 55 are attached (step S101). Specifically, the load cell 10 and the detection marker 50 are attached to predetermined positions on the lower end of the trunk 100 with the trunk 100 in a completely closed state. The reference marker 55 is attached to a fender on the rear of the vehicle body. At this time, the detection marker 50 and the reference marker 55 are photographed by the camera 30, and the relative positions of the detection marker 50 and the reference marker 55 when the trunk 100 is completely closed are stored.

The following is a description of an actual evaluation process being executed. First, it is determined whether the trunk is in an inspection-ready state (standby state) (step S102). Specifically, it is determined whether the trunk 100 to which the load cell 10 and the detection marker 50 are attached is in an open state. It is determined whether the trunk 100 is in an inspection-ready state on the basis of whether or not the relative distance between the detection marker 50 and the reference marker 55 is equal to or greater than a fixed distance.

If it is determined that the trunk is not in an inspection-ready state (step S102: NO), the trunk 100 is opened by a worker, and the apparatus waits until an inspection-ready state is reached. On the other hand, if it is determined that the trunk is in an inspection-ready state (step S102: YES), an initialization process is executed (step S103). After the initialization process has been executed, a new measurement is begun.

Next, measurement is performed (step S104). Specifically, a worker closes the trunk 100, during which period the load (operating force) placed upon the trunk 100 by the worker is detected by the load cell 10. Simultaneously, the movement paths of the detection marker 50 and the reference marker 55 moving in tandem with the motion of the closing trunk 100 are photographed by the camera 30.

Next, the positions of the detection marker 50 and the reference marker 55 are recognized (step S105). Specifically, the image data obtained by the camera 30 is analyzed, and the relative positions of the detection marker 50 and the reference marker 55 after the trunk 100 has been closed are recognized. The reference marker 55 is attached to the vehicle body, and the detection marker 50 is attached to the trunk 100. The relative positions of the detection marker 50 and the reference marker 55 are recognized so that the movement distance of the trunk can be accurately ascertained even if the vehicle body vibrates or moves.

Next, it is determined whether or not the trunk 100 is completely closed (step S106). Specifically, it is determined whether the trunk 100 is completely closed or not completely closed. The position of the detection marker 50 recognized via the process shown in step S105 and the position of the reference marker 55 recognized when the trunk 100 has been completely closed are compared with pre-stored relative positions. If the distance between the recognized relative positions of the detection marker 50 and the reference marker 55 is greater than the pre-stored relative positions, the trunk 100 is determined to be not completely closed.

If it is determined that the trunk 100 is not completely closed (step S106: NO), the display 45 displays that the trunk 100 is not completely closed (step S107), and the process returns to step S102. Upon seeing that the trunk 100 is not completely closed, the worker can recognize that insufficient force was used to close the trunk 100, and open the trunk 100 to repeat the inspection.

On the other hand, if the trunk 100 is determined to be completely closed (step S106: YES), the displacement level S of the trunk 100 and the load F placed upon the trunk 100 are calculated (step S108). Specifically, the image data obtained by the camera 30 photographing the relative positions of the detection marker 50 and the reference marker 55 is analyzed, and the displacement level of the detection marker 50 with respect to the reference marker 55 is calculated as the displacement level S of the trunk 100. The load F placed upon the trunk 100 when the worker closes the trunk 100 is also calculated on the basis of load data obtained by the load cell 10. At this point, a data interpolation process is performed upon the image data in order to synchronize the load cell 10 and the camera 30. A masking process is also performed upon the image data in order to eliminate ambient light interference. The data interpolation process and the masking process are the same as in the first embodiment.

Next, the closing speed V and the energy W of the trunk 100 are calculated (step S109). Specifically, the displacement level S of the trunk 100 calculated using the process shown in step S108 is temporally derived in order to calculate the closing speed V of the trunk 100. The integrated value of the load F calculated using the process shown in step S108 and the displacement level S of the trunk 100 is also calculated in order to calculate the energy W when the trunk 100 is closed. The energy W is calculated according to the same method used in the first embodiment.

Next, it is determined whether the closing speed V immediately prior to the trunk 100 closing is equal to or less than the specified value $V_0$ (step S110). Specifically, it is determined whether or not the closing speed V calculated using the process shown in step S109 is equal to or less than the specified value $V_0$. More specifically, it is determined whether the average closing speed V over a predetermined distance interval preceding a door closed position at which the trunk 100 is completely closed is equal to or less than the specified value V0.

If it is determined that the closing speed V is not equal to or less than the specified value $V_0$ (step S110: NO), the display 45 displays that the closing speed V is excessive (step S111), and the process returns to step S102. Upon seeing that the closing speed V is excessive, the worker can recognize that excessive force was used to close the trunk 100, and open the trunk to repeat the inspection.

On the other hand, if it is determined that the closing speed V is equal to or less than the specified value $V_0$ (step S110: YES), it is determined whether or not the energy W is equal to or less than the specified value $W_0$ (step S112). Specifically, it is determined whether the energy W calculated using the process shown in step S109 is equal to or less than the specified value $W_0$.

If it is determined that the energy W is not equal to or less than the specified value $W_0$ (step S112: NO), the display 45 displays that the energy W is excessive (step S113), and the process returns to step S102. Upon seeing that the energy W is excessive, the worker can recognize that excessive force was used to close the trunk 100, and open the trunk to repeat the inspection.

On the other hand, if it is determined that the energy W is equal to or less than the specified value $W_0$ (step S112: YES), the results are displayed on the display 45 (step S114), and the process finishes. Specifically, the display 45 displays the closing speed V and the energy W, and indicates that closing performance is satisfactory. The closing performance of the trunk 100 is better the lower the closing speed V is. Similarly, the closing performance of the trunk 100 is better the lower the energy W is. The various calculation results and assessment results are stored in the hard disk 44.

In accordance with the second embodiment, as described above, the camera 30 photographs the relative positions of the detection marker 50 and the reference marker 55 attached to the trunk 100, thereby allowing the displacement level S of the trunk 100 to be accurately calculated. As a result, the closing speed V and the energy W of the trunk 100 are accurately calculated, allowing the closing performance of a trunk 100 that has an unusual opening and closing path to be evaluated in both a sampling inspection performed upon a stopped vehicle and a final inspection performed upon a moving vehicle.

The second embodiment described above yields the following effects.

(a) In the opening/closing body inspection apparatus and opening/closing body inspection method according to the second embodiment, the camera photographs the relative displacement of the detection marker attached to the trunk and the reference marker attached to the rear part of the vehicle body, thereby allowing the displacement level of the trunk to be accurately calculated. As a result, the closing speed and energy of the trunk can be accurately calculated even if the vehicle body is vibrating vertically or moving, allowing the closing performance of a trunk having an unusual opening and closing path to be evaluated. Whereas measurement can only be performed when the automobile is stationary in the case of the opening/closing body inspection apparatus and opening/closing body inspection method according to the first embodiment, measurement is possible even when the automobile is moving in the case of the opening/closing body inspection apparatus and opening/closing body inspection method according to the second embodiment.

(b) A masking process is performed upon the image data, thereby eliminating ambient light interference from the image data. As a result, the movement path of the reflective marker can be precisely extracted, and the displacement level of the trunk can be precisely calculated.

(c) Because the data interpolation process is performed upon the image data, the load cell and the camera can be precisely synchronized. As a result, the energy can easily be calculated. Because the displacement level is calculated at ¹⁄₁₀th the time interval, the closing speed prior to the trunk closing can be more accurately calculated.

(d) Because the position of the reflective marker is used to determine whether or not the trunk is not completely closed, the worker is spared the labor of having to check whether the trunk is not completely closed. This eliminates mistaken evaluation errors arising from human error.

The first embodiment and second embodiment described above feature examples in which reflective markers capable of reflecting infrared radiation are used for the reflective marker 20, the detection marker 50, and the reference marker 55. However, because the intensity of the reflected infrared radiation will be altered by differences in distance arising from the movement of the vehicle or contamination on the surfaces of the markers in the case of a reflective marker, there may be instances in which it is impossible for the camera to recognize the position of the reflective marker at stable intensity, reducing the precision of the evaluation of the closing performance of the trunk 100.

Thus, an opening/closing body inspection apparatus according to a third embodiment uses self-luminous markers for the reflective marker 20, the detection marker 50, and the reference marker 55. LEDs are used for the reflective marker 20, the detection marker 50, and the reference marker 55, and the various markers are provided with diffusing members for diffusing light emitted by the LEDs.

The self-luminescent marks used in the opening/closing body inspection apparatus according to the third embodiment will now be described.

Embodiment 3

Figure 14:
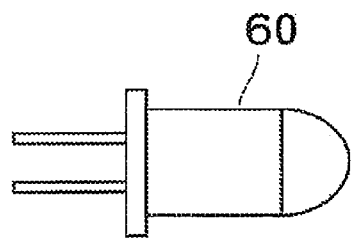
FIG. 14 is a diagram of the configuration of an LED used as a detection marker and as a reference marker.
Figure 15:
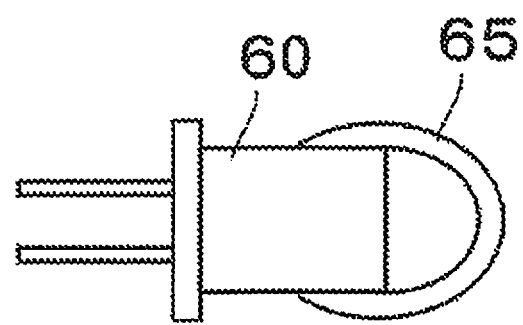
FIG. 15 is a diagram of the configuration of a diffusing member with which the LED is provided.

FIG. 14 is a diagram of the configuration of an LED used as a detection marker and as a reference marker. FIG. 15 is a diagram of the configuration of a diffusing member with which the LED is provided.

As shown in FIG. 14, an LED 60 is used instead of the reflective marker 20 shown in FIG. 1 and the detection marker 50 and reference marker 55 shown in FIG. 10. The LED 60 emits infrared radiation. The LED 60 itself is an ordinary one, and thus will not be described in detail; using an LED 60 for the reflective marker 20, the detection marker 50, and the reference marker 55 will facilitate recognition by the camera 30.

In the case of an LED 60, the brightness of the LED 60 can be selected; thus, using an LED 60 of a brightness appropriate to the distance between the camera 30 and the vehicle body eliminates the need to adjust the sensitivity of the camera 30. If reflective markers are used, as in the case of the first embodiment and the second embodiment, the camera 30 must be adjusted according to the degree of reflection; however, using an LED 60 yields sufficient brightness, generally eliminating the need to adjust the camera 30 and allowing inspection time to be reduced.

The LED 60 generally emits light in a narrow angle. The brightness of the LED 60 is extremely high from the front, but is extremely low in areas other than the front. This may lead to the camera 30 having difficulty picking up the infrared radiation from the LED 60, depending upon the angle thereof with respect to the camera 30. In the third embodiment, as shown in FIG. 15, a spherical diffusing member 65 is attached so as to cover the light-emitting part of the LED 60.

The diffusing member 65 is a sphere formed from an acrylic material. This sphere radially radiates infrared radiation emitted by the LED 60. Simply attaching an acrylic sphere to the LED 60 would yield insufficient infrared radiation diffusion; thus, the inner and outer surfaces of the sphere are machined so as to have raised and recessed parts, with the result that the infrared radiation emitted by the LED 60 is actively diffusely reflected by the raised and recessed parts, yielding a uniform brightness around the entire periphery of the LED 60.

The diffusing member 65 may be a diffusing cap formed separately from the LED 60 and placed thereupon, or may be formed by machining raised and recessed sections in the outer circumferential surface of the LED 60. Even if a LED 60 is used, it is preferable that the optical axis of the LED 60 be aligned with the optical axis of the camera 30. A USB port of the PC 40 or a commercially available rechargeable battery may be used as the power source of the LED 60.

A comparison of cases in which reflective markers are used, as in the case of the first embodiment or the second embodiment, and cases in which self-luminescent markers are used, as in the case of the third embodiment, shows that using self-luminescent markers reduces variations in door closing performance evaluations by half or more. It is apparent that using an LED 60 improves evaluation precision.

The foregoing has been a description of three embodiments of the opening/closing body inspection apparatus and opening/closing body inspection method according to the present invention. However, it goes without saying that a person skilled in the art may make additions or modifications to or omissions from the present invention, as appropriate, within the scope of the technical concept thereof.

The embodiments described above feature examples in which the closing performance of a trunk provided with a four-link hinge mechanism is evaluated. However, the opening/closing body whose closing performance is evaluated using the opening/closing body inspection apparatus according to the present invention is not limited to the trunk of an automobile. The opening/closing body inspection apparatus according to the present invention may also be applied to the evaluation of the closing performance of a door of an automobile or a door other than that of an automobile.

The invention claimed is:

1. An opening/closing body inspection apparatus for evaluating the closing performance of an opening/closing body open-and-closably attached to an opening/closing body support member, the apparatus comprising:
   a marker configured to be attached to the opening/closing body;
   a load-detecting device configured to detect a load upon the opening/closing body;
   an image-capturing device configured to capture an image of a movement path of the marker when the marker is attached to the opening/closing body as the marker moves in tandem with the motion of the opening/closing body being closed by the load;
   an image-processing unit configured to analyze image data obtained by the image-capturing device, and to calculate a movement distance of the opening/closing body; and
   a performance-assessing unit configured to assess the closing performance of the opening/closing body on the basis of the movement distance calculated by the image-processing unit and the load detected by the load-detecting device.

2. The opening/closing body inspection apparatus according to claim 1, further comprising:
   a mask-setting unit configured to set a mask zone for extracting the movement path on the image data; and
   the image-processing unit being configured to analyze image data on which the mask-setting unit has set a mask zone to calculate the movement distance.

3. The opening/closing body inspection apparatus according to claim 2, further comprising
   an interpolation unit,
   the image-capturing device being configured to capture an image of the movement path of the marker at predetermined time intervals, and
   the interpolation unit being configured to divide an area between two positions of the marker calculated from two temporally adjacent image data out of the image data obtained at the predetermined time intervals, and to interpolate the image data.

4. The opening/closing body inspection apparatus according to claim 2, further comprising
   an incomplete closure-determining unit configured to determine whether the opening/closing body is not completely closed on the basis of the position of the marker, and the opening/closing body inspection apparatus being configured to evaluate the closing performance of an automobile opening/closing body open-and-closably attached to a main body of an automobile.

5. The opening/closing body inspection apparatus according to claim 2, wherein
the marker includes an LED.

6. The opening/closing body inspection apparatus according to claim 1, further comprising
an interpolation unit,
the image-capturing device being configured to capture an image of the movement path of the marker at predetermined time intervals, and
the interpolation unit being configured to divide an area between two positions of the marker calculated from two temporally adjacent image data out of the image data obtained at the predetermined time intervals, and to interpolate the image data.

7. The opening/closing body inspection apparatus according to claim 1, further comprising
an incomplete closure-determining unit configured to determine whether the opening/closing body is not completely closed on the basis of the position of the marker, and
the opening/closing body inspection apparatus being configured to evaluate the closing performance of an automobile opening/closing body open-and-closably attached to a main body of an automobile.

8. The opening/closing body inspection apparatus according to claim 1, wherein
the marker includes an LED.

9. The opening/closing body inspection apparatus according to claim 8, wherein
the marker includes a diffusing member configured to diffuse light emitted by the LED.

10. An opening/closing body inspection apparatus for evaluating the closing performance of an opening/closing body open-and-closably attached to an opening/closing body support member, the apparatus comprising:
a reference marker configured to be attached to the opening/closing body support member;
a detection marker configured to be attached to the opening/closing body;
a load-detecting device configured to detect a load upon the opening/closing body;
an image-capturing device configured to capture an image of the position of the detection marker and the position of the reference marker when the detection marker is attached to the opening/closing body and the reference marker is attached to the opening/closing body support member as the detection marker and the reference marker move in tandem with the motion of the opening/closing body being closed by the load;
an image-processing unit configured to analyze image data obtained by the image-capturing device, and to calculate the movement distance of the opening/closing body with respect to the opening/closing body support member; and
a performance-assessing unit configured to assess the closing performance of the opening/closing body on the basis of the movement distance calculated by the image-processing unit and the load detected by the load-detecting device.

11. The opening/closing body inspection apparatus according to claim 10, wherein
the image-capturing device is configured to capture an image of the position of the detection marker and the position of the reference marker at predetermined time intervals, and
the image-processing unit is configured to calculate the movement distance of the opening/closing body with respect to the opening/closing body support member by calculating the relative positions of the detection marker and the reference marker.

12. The opening/closing body inspection apparatus according to claim 10, wherein
at least one of the detection marker and the reference marker includes an LED.

13. The opening/closing body inspection apparatus according to claim 12, wherein
the at least one of the detection marker or reference marker including the LED includes diffusing member configured to diffuse light emitted by the LED.

14. An opening/closing body inspection method for evaluating the closing performance of an opening/closing body open-and-closably attached to an opening/closing body support member, the method comprising:
capturing, via an image-capturing device, an image of a movement path of a marker attached to the opening/closing body as the marker moves in tandem with the motion of the opening/closing body being closed by a load placed thereupon while a load-detecting device detects the load placed upon the opening/closing body;
analyzing image data obtained by the image-capturing device, and calculating a movement distance of the opening/closing body; and
assessing the closing performance of the opening/closing body is on the basis of the calculated movement distance and the load detected by the load-detecting device.

15. An opening/closing body inspection method for evaluating the closing performance of an opening/closing body open-and-closably attached to an opening/closing body support member, the method comprising:
capturing, via an image-capturing device, an image of the position of a reference marker attached to the opening/closing body support member and the position of a detection marker attached to the opening/closing body as the detection marker moves in tandem with the motion of the opening/closing body being closed by a load placed thereupon while a load-detecting device detects the load placed upon the opening/closing body;
analyzing image data obtained by the image-capturing device, and calculating a movement distance of the opening/closing body; and
assessing the closing performance of the opening/closing body on the basis of the calculated movement distance and the load detected by the load-detecting device.

* * * * *